July 19, 1949.　　　　R. J. ROUSH　　　　2,476,455
ELECTRICAL CAPACITOR AND METHOD OF MAKING IT
Filed Nov. 16, 1945
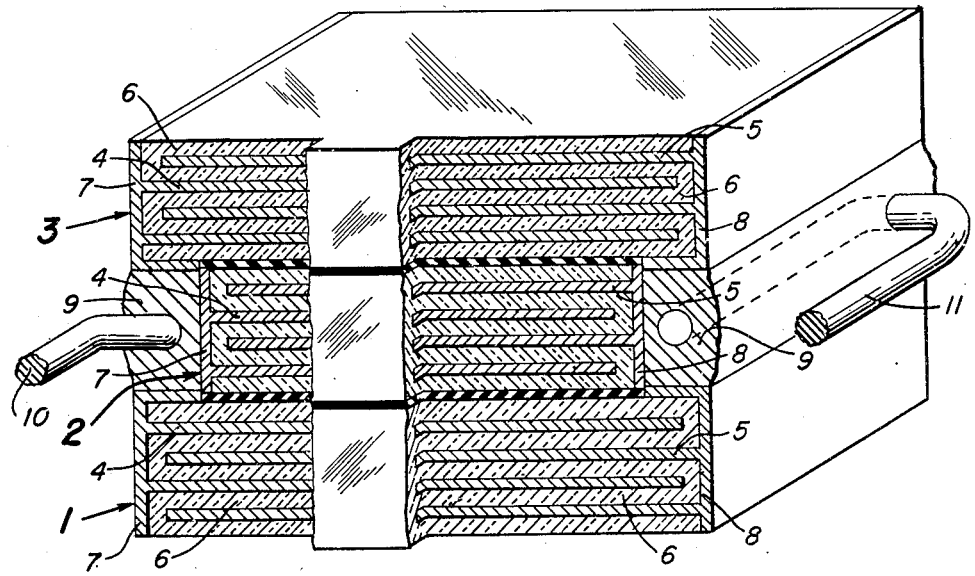
*Richard J. Roush*
　　　　INVENTOR.
BY
*ATTORNEY*

Patented July 19, 1949

2,476,455

UNITED STATES PATENT OFFICE 2,476,455

ELECTRICAL CAPACITOR AND METHOD OF MAKING IT

Richard J. Roush, Niagara Falls, N. Y., assignor to E. I. du Pont de Nemours & Company, Wilmington, Del., a corporation of Delaware Application November 16, 1945, Serial No. 629,170

3 Claims. (Cl. 154—80)

This invention relates to electrical capacitors and method of constructing the same. More particularly, it relates to electrical capacitors comprising a plurality of capacitor units, each of which is composed of metallic electrodes embedded in a vitreous enamel dielectric, said units being connected together to form an assembled, unitary capacitor, and an improved method of assembling and connecting said units.

Electrical capacitors, in order to be suitable for diversified uses in the art, must be capable of exhibiting good insulation resistance after exposure to moisture and extreme temperature variations. In order to meet joint Army-Navy specifications, "Capacitors, mica dielectric, fixed, JAN–C–5," at least eleven out of twelve capacitors must be capable of withstanding the following test:

The capacitors are exposed to five atmospheric temperature cycles in which the temperature is varied from −55° C. to 85° C. and then to two cycles of 15 minutes each of immersion in tap water, the temperature of which is varied from 20° C. to 65° C. The capacitors are then taken from the water and the surface moisture removed by wiping with a dry cloth. Within 30 minutes after removal from the water immersion tank, the capacitors are subjected to measurement of insulation resistance. The insulation resistance must be greater than 3000 megohms.

Individual capacitor units in which the several metallic electrodes are completely embedded and surrounded by alternating layers or sheaths of vitreous enamel dielectric and in which the several layers of vitreous enamel are fused together in the construction thereof usually withstand the above test without much difficulty. In constructing capacitors with a vitreous enamel dielectric, however, it is often necessary, for the purpose of obtaining the desired capacitance, to fasten together a plurality of the above-described capacitor units. This is done by stacking a plurality of such units of the proper shape and size on top of each other with the terminals of one series of electrodes of each unit all at one side of the stack and the terminals of the opposite series of electrodes of each unit all at the opposite sides of the stack, and then soldering a single lead wire to each of the opposite sides of the stack to electrically connect to each of the single lead wires the oppositely disposed terminals of the individual units. Such multi-unit capacitors, which function as unitary capacitors, can be built up of 2, 3, 4 or more units.

Heretofore, multi-unit capacitors comprising a plurality of assembled capacitor units very frequently failed to pass the above-described test by reason of moisture contained in the space between the assembled capacitor units, the moisture causing electrical conductance between the oppositely disposed soldered lead wires. Attempts have been made, prior to this invention, to prevent moisture from entering the space between such units by the use of bonding and filling materials. Such materials used prior to this invention were not fully satisfactory to permit the assembled structures to consistently pass the above-mentioned test conditions.

Compositions comprising many kinds and types of filling materials in volatile solvents, including electrical varnishes, have been used between assembled units of the type above-described. Such compositions were found to have two main disadvantages; in the first place, it was extremely difficult to evaporate the solvents from the interior of the narrow spaces between units, and secondly, the evaporation of the solvent left large residual voids through which moisture could enter.

Numerous thermoplastic materials, for example, waxes and resins, were also used for the abovesaid purpose but due to temperature extremes these materials were found to melt at high temperatures or crack at low temperatures, and such materials were furthermore found to have very poor mechanical strength and lasting qualities.

It is an object of this invention to construct an electrical capacitor comprising a plurality of capacitor units, each composed of metallic electrodes embedded in a vitreous enamel, said units being fastened together in such a manner as to prevent the entrance of moisture between said units.

It is another object of this invention to construct an electrical capacitor comprising a plurality of capacitor units, each composed of metallic electrodes embedded in a vitreous enamel, said multi-unit capacitor being capable of withstanding the above-described joint Army-Navy specification test.

Other objects of the invention will appear hereinafter.

The above objects may be accomplished by fastening together a plurality of capacitor units comprising metallic electrodes embedded in vitreous enamel dielectric with a butyl methacrylate polymer, dissolved in substantially non-volatile, liquid, polymerizable monomer taken from the group consisting of a butyl methacrylate and styrene, between the vitreous enamel surfaces of said units, and subjecting said monomers to polymerization.

The accompanying drawing is a perspective view, with parts shown in cross-section, of a multi-unit capacitor constructed in accordance with the invention.

In the drawing, reference numerals 1, 2 and 3 designate three capacitor units, each of which is composed of metallic electrodes 4 and oppositely disposed metallic electrodes 5, all of which are embedded in vitreous enamel dielectric 6. The electrodes 4 of each unit have a metallic connecting terminal 7 at one end of the unit, and electrodes 5 of each unit have a similar metallic connecting terminal 8 at the opposite end of the unit. The units are stacked so that the terminals 7 are all on one end of the assembled capacitor and the terminals 8 are all on the opposite end thereof. It will be noted that for ease and security of assembling, the middle unit 2 is slightly shorter between terminals than units 1 and 3. The rectangular space at the terminal end of the assembled structure between the three units is now filled with a metallic solder 9 in which oppositely disposed lead wires 10 and 11 are embedded. The solder makes an electrical connection between the three terminals 7 at one end and between the three terminals 8 at the opposite end so that a unitary capacitor is thereby formed.

The spaces between the three capacitors units 1, 2, and 3 are filled in with a butyl methacrylate polymer dissolved in butyl methacrylate monomer or styrene, or a mixture of butyl methacrylate monomer and styrene. The butyl methacrylate filling material may be placed in the spaces between units in any desired manner. For example, the individual units, before stacking, may be coated with the filling material by dipping, spraying, brushing, or the like, at the surfaces which will contact each other by assemblage. Alternatively, the filling material may be forced between the units after assembling or stacking. This may, for example, be done by subjecting the assembled structure to vacuum in a vacuum chamber and passing the filling material under atmospheric pressure against the end of the space between units by means of a conduit passing through the side wall of the vacuum chamber, thus causing the filling material to be drawn by suction into the space between units.

The filling material comprising a butyl methacrylate polymer dissolved in a butyl methacrylate monomer or monomeric styrene may be prepared in any desired manner. For example, completely polymerized butyl methacrylate polymer may be dissolved in one of or a mixture of the monomers, or a mixture of the two monomers may be partially polymerized. By partial polymerization a solution of the butyl methacrylate polymer in the monomer will be formed. Both normal and isobutyl methacrylate monomer or polymer are suitable for use in accordance with this invention.

The proportions of polymer and monomer, or monomers, in the filling material composition to be applied to the capacitor units in the assembly, are dependent upon the viscosity of the composition desired. In assembling and connecting together small, thin capacitor units which fit closely together, a low viscosity, rather highly fluid composition will produce the most desirable results. On the other hand, where the space between units is rather large, a higher viscosity, less fluid composition will produce better results. Compositions ranging in viscosity from 5 to 2000 centipoises at 25° C. have been found to be useful as filling material between capacitor units as above-described.

The butyl methacrylate monomer or the monomeric styrene, or any mixture of the two, contained in the filling material composition which is to be applied to the assembled units must be polymerizable. If necessary, in order to be polymerizable, it must contain an amount of polymerizing catalyst sufficient to permit the polymerization, in situ, in the assembled structure, of the filling composition. For example, benzoyl peroxide, lauryl peroxide, hydrogen peroxide, peracetals, perborates, ammonium or alkali metal perdisulfates, or other catalysts which will cause polymerization of butyl methacrylate or styrene may be used for this purpose. Usually between 0.1% and 2.0% of the catalyst, based on the weight of the total composition, will be sufficient for this purpose; however, larger amounts of catalyst can be used, if desired.

The filling composition may, if the voids between units are particularly large, contain inert filling materials such as wood flour, asbestos fibers, mica flake or similar substances. The filling composition may also contain small amounts of other polymeric materials or polymerizable monomers. However, it is generally desired that at least 75% of the filling composition be composed of the butyl methacrylate polymer in one of, or a mixture of said monomers. The composition must be substantially free from volatile constituents of any kind. Of course, very small quantities of volatile substances can be tolerated with fair results. However, the volatile constituents should not exceed 2% of the weight of the composition. By "volatile constituents" is meant substances which will volatilize from the composition under the conditions of polymerization of the composition.

The polymerizable constituents of the filling composition are polymerized, in situ, between the capacitor units by heating the assembled structure to a temperature of between 50° C. and 200° C. The polymerization is usually substantially complete after subjecting the same to a temperature of 70° C. to 150° C. for a period of 15 minutes to 5 hours.

The following detailed examples are given to illustrate preferred filling compositions produced in accordance with the present invention, it being understood that the invention is not be limited to the particular details given in the examples.

*Example I*

Two filling preparations having the following compositions are prepared by dissolving, at room temperature, normal butyl methacrylate polymer in monomeric styrene or a mixture of monomeric styrene and normal butyl methacrylate monomer, and adding lauryl peroxide.

|  | 1 | 2 |
| --- | --- | --- |
|  | Per cent | Per cent |
| Styrene monomer | 49.87 | 29.8 |
| Normal butyl methacrylate monomer |  | 36.8 |
| Normal butyl methacrylate polymer | 49.87 | 32.7 |
| Lauryl peroxide | 0.26 | 0.7 |

Composition 1 has a viscosity of 120–150 centipoises, and composition 2 has a viscosity of 15–25 centipoises, at 25° C.

Both of the above compositions can be applied at room temperature by vacuum impregnation, or other method of application, and they can be cured to a hard, rough state, free from voids at a temperature of between 70° C. and 140° C. for 30 minutes to 4 hours. These compositions have no detrimental effect on the electrical properties of the capacitors and impart excellent sealing and moisture-resistance characteristics to a multi-unit capacitor containing the same. A group of 12 multi-unit capacitors of the type shown in the drawing above referred to were constructed with the composition 1 shown above, baked 45 minutes at 140° C. and then given the above-described joint Army-Navy thermal cycle and water immersion tests. After taking the capacitors from the immersion tank after the test and wiping off surface moisture with a soft, dry cloth, they were all found to have a measured D. C. resistance between terminal lead wires greater than 100,000 megohms. A similar group of capacitors containing a filling between units of a commercial electrical impregnating varnish had a measured D. C. resistance between terminal lead wires of less than 100 megohms. Composition 2, set forth above, gave results similar to composition 1.

Example II

A filling composition composed of normal butyl methacrylate polymer and normal butyl methacrylate monomer was prepared by dissolving the polymer in the monomer at room temperature in the following proportions:

| | Per cent |
|---|---|
| Normal butyl methacrylate polymer | 33.2 |
| Normal butyl methacrylate monomer | 66.4 |
| Lauryl peroxide | 0.4 |

This composition has a viscosity of approximately 20 centipoises and is ideal for filling the spaces between capacitor units by conventional vacuum impregnation, or other commonly known methods of application. The liquid composition is cured by baking at a temperature of from 70° C. to 140° C. for from 30 minutes to 4 hours.

The resulting composition when applied to a multi-unit capacitor in the manner set forth in Example I and tested for insulation resistance produced results approximately the same as compositions 1 and 2 of Example I.

Example III

A mixture of normal butyl methacrylate monomer and monomeric styrene in the following proportions:

| | Per cent |
|---|---|
| Normal butyl methacrylate monomer | 49.6 |
| Styrene monomer | 49.6 |
| Lauryl peroxide | 0.8 | was partially polymerized by heating to a temperature of 120° C. for 33 minutes and when cooled to room temperature (approximately 70° F.) had a viscosity of 32 centipoises. The resulting composition was applied, by brushing, on the surfaces to be joined of three vitreous enamel dielectric capacitor units of the type shown in the accompanying drawing. The units were assembled, the lead wires soldered in place, and the capacitor baked for a period of 45 minutes at a temperature of 140° C. The resulting multi-unit capacitor, when subjected to the above-described Army-Navy specification test, had an insulation resistance of over 100,000 megohms.

In the above examples, iso-butyl methacrylate may be substituted for the normal butyl methacrylate with substantially equivalent results. The vitreous enamel surfaces of the individual capacitor units, before application of the butyl methacrylate filling compositions, are made chemically clean to ensure good D. C. resistance of the resulting multi-unit capacitor. If the surfaces of the capacitor units are not substantially clean, the D. C. insulation resistance will not be as high as in the case of units having clean surfaces.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. The method of assembling an electrical capacitor from a plurality of capacitor units each composed of metallic electrodes embedded in a vitreous enamel which comprises placing together in a stack a plurality of said units with a filling composition between the enamel surfaces thereof, said filling composition comprising a butyl methacrylate polymer dissolved in a liquid, polymerizable monomer taken from the group consisting of a butyl methacrylate and styrene, and subjecting said mass to polymerization.

2. The method of assembling an electrical capacitor from a plurality of capacitor units each composed of metallic electrodes embedded in a vitreous enamel which comprises placing together in a stack a plurality of said units with a filling composition between the enamel surfaces thereof, said filling composition comprising a partially polymerized mixture of a butyl methacrylate and styrene, and subjecting said mass to polymerization.

3. An electrical capacitor produced by the method of claim 1.

RICHARD J. ROUSH.

REFERENCES CITED

The following references are of record in the file of this patent:

UNITED STATES PATENTS

| Number | Name | Date |
|---|---|---|
| 2,116,318 | Miles | May 3, 1938 |
| 2,206,720 | Ducati | July 2, 1940 |